US006498456B2

(12) United States Patent
Ettes et al.

(10) Patent No.: US 6,498,456 B2
(45) Date of Patent: Dec. 24, 2002

(54) INDUCTIVE COUPLING SYSTEM WITH CAPACITIVE PARALLEL COMPENSATION OF THE MUTUAL SELF-INDUCTANCE BETWEEN THE PRIMARY AND THE SECONDARY WINDINGS

(75) Inventors: Wilhelmus Gerardus Maria Ettes, Drachten (NL); Jorge Luiz Duarte, Maastricht (NL); Johannes Lambertus Franciscus Van Der Veen, Eindhoven (NL)

(73) Assignee: Koninklijke Philips Electronics N.V, Eindhoven (NL)

( * ) Notice: Subject to any disclaimer, the term of this patent is extended or adjusted under 35 U.S.C. 154(b) by 0 days.

(21) Appl. No.: 10/085,671

(22) Filed: Feb. 27, 2002

(65) Prior Publication Data

US 2002/0130642 A1 Sep. 19, 2002

(30) Foreign Application Priority Data

Mar. 2, 2001 (EP) .......................................... 01200777

(51) Int. Cl.[7] .................................................. H02J 7/00
(52) U.S. Cl. ....................................... 320/108; 320/107
(58) Field of Search ................................ 320/108, 107, 320/109; 336/DIG. 2, 131, 132; 363/22

(56) References Cited

U.S. PATENT DOCUMENTS 5,574,470 A * 11/1996 De Vall ...................... 343/895
5,680,028 A * 10/1997 McEachern ............ 336/DIG. 2
5,923,544 A 7/1999 Urano ......................... 363/22
6,028,413 A * 2/2000 Brockmann ................. 320/108

FOREIGN PATENT DOCUMENTS

EP 0817351 A2 7/1998 ............. H02J/7/00

OTHER PUBLICATIONS

Patent Abstract of Japan , Kounofuji Masaaki, Controller For Noncontact Charger Publication No. 2000166130, Jun. 16, 2000, Application No. 10336995, Nov. 27, 1998.

* cited by examiner

*Primary Examiner*—Edward H. Tso
*Assistant Examiner*—Lawrence Luk

(57) ABSTRACT

To improve the performance of an inductive coupling system, the magnetic coupling between the primary (4) and secondary (8) windings is increased by adding auxiliary windings (26,28) on the primary (2) and/or secondary (6) yokes of the assembly near the air gap (18) between the yokes. Capacitors (30,32) are connected to the auxiliary windings (26, 28) which, together with the inductance of the auxiliary windings, resonate at the operating frequency of the primary AC voltage (Vp). The effect is an improved magnetic coupling between the primary and secondary windings (4, 8) without increasing the size of the magnetic assembly.

8 Claims, 4 Drawing Sheets

INDUCTIVE COUPLING SYSTEM WITH CAPACITIVE PARALLEL COMPENSATION OF THE MUTUAL SELF-INDUCTANCE BETWEEN THE PRIMARY AND THE SECONDARY WINDINGS

FIELD OF TECHNOLOGY

This application relates to inductive coupling system transformers and high frequency DC-DC converters.

BACKGROUND AND SUMMARY

The invention relates to an inductive coupling system comprising: a magnetizable core with a primary yoke (2) which is provided with a primary winding (4) for connecting an AC supply voltage (Vp) and a secondary yoke (6) which is provided with a secondary winding (8), which primary yoke (2) and secondary yoke (6) have corresponding end surfaces (10, 14; 12, 16) for magnetic energy transfer between the primary yoke (2) and the secondary yoke (6).

Such an inductive coupling system is known as a transformer, which may or may not form part of a DC-DC converter which operates at a high frequency and in which the primary and secondary yokes of the transformer core are rigidly disposed with respect to each other and are mechanically integral with each other. An example is the so-called "power plug", in which the mains voltage is converted by means of a DC-DC converter into a lower operating voltage which is not in direct electrical contact with the mains voltage.

Such an inductive coupling system is also known from contactless inductive charging systems for rechargeable appliances, such as electric toothbrushes, razors and mobile telephones. In this case, the primary and secondary yokes can be separated, the primary yoke being accommodated in a so-called "stand" and the secondary yoke being accommodated in the rechargeable appliance. The rechargeable appliance is placed back in the stand after use, such that the primary and secondary yokes are so positioned with respect to each other that the yokes and their windings form a transformer again.

In both the aforesaid cases, the relatively large air gap between the end surfaces of the yokes leads to an imperfect magnetic coupling between the primary part and the secondary part of the coupling system. In the case of fixed transformers, it may be the cost price and dimensional tolerance that causes this large air gap, and in the case of inductive charging systems, the main cause is the nature of the design of the stand and of the appliance. A consequence of the large air gap is that a substantial portion of the magnetic field lines that exit from the end surfaces of the primary yoke is not detected by the corresponding end surfaces of the secondary yoke. This leads to major wattless currents through the primary winding and to losses in the primary winding and in the electronic components that drive the primary winding.

A solution might be to increase the dimensions of the yokes so as to increase the magnetic coupling between the yokes, but this leads to an increased cost price on the one hand and to a limitation of the freedom of design on the other hand.

Accordingly, it is an object of the invention to provide an inductive coupling system which exhibits an improved magnetic coupling between the primary and the secondary parts of the coupling system.

In order to accomplish the above object, the inductive coupling referred to in the introduction is characterized in that said inductive coupling system comprises means for capacitive parallel compensation of a mutual self-inductance of the coupling system at the frequency of the primary AC voltage.

In the equivalent model of the inductive coupling system, the magnetic coupling between the primary and the secondary parts is represented by the mutual self-inductance. The poor magnetic coupling manifests itself as a low value of the mutual self-inductance in comparison with the primary leakage inductance. The capacitive parallel compensation provides a capacitance which is connected in parallel to the mutual self-inductance and which, together with the mutual self-inductance, forms a parallel resonance circuit that resonates at the frequency of the primary AC voltage. In the case of parallel resonance, the impedance of the parallel circuit is high and hardly any wattless current flows from and to the parallel circuit any more. The impeding influence of the air gap is considerably reduced in this manner, and consequently nearly all magnetic energy will still flow from the primary part to the secondary part of the coupling system without the dimensions of the yokes themselves being changed.

The capacitive parallel compensation is preferably realized in the form of an auxiliary winding which is arranged near at least one of the aforesaid end surfaces, to which auxiliary winding a capacitor is connected which resonates with the auxiliary winding at the frequency of the primary AC voltage.

Various advantageous configurations as claimed in the dependent claims are possible for placing one or more auxiliary windings on the yokes of the inductive coupling system, which yokes may be U-shaped or E-shaped.

BRIEF DESCRIPTION OF THE DRAWING FIGURES

The invention will now be explained in more detail with reference to the appended drawing, in which.

Corresponding elements have been given the same reference symbols in the FIGS.

DETAILED DESCRIPTION

Figure 1:
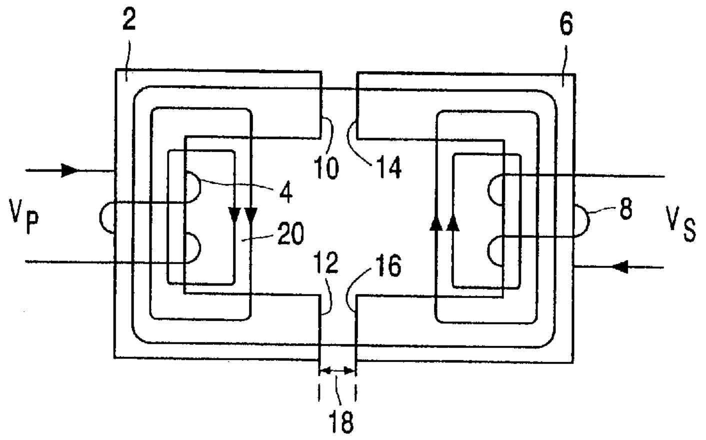
FIG. 1 is a schematic representation of a conventional inductive coupling system.

FIG. 1 is a schematic representation of a conventional inductive coupling system. The system comprises a magnetizable core with a primary yoke 2 provided with a primary winding 4 to which a primary AC voltage Vp can be connected, and a secondary yoke 6 provided with a secondary winding 8 for deriving a secondary AC voltage Vs. The primary yoke 2 and the secondary yoke 6 are U-shaped, for example, and the primary winding 4 and the secondary winding 8 are both arranged on the respective central portions of the yokes. The primary yoke 2 has two end surfaces 10 and 12 which are positioned opposite corresponding end surfaces 14 and 16, an air gap 18 being arranged between the corresponding end surfaces.

The primary yoke 2 and the secondary yoke 6 may be rigidly positioned with respect to each other, for example as in a transformer for a mains voltage adapter, also called power plug. The yokes may alternatively be separable, however, the primary yoke being accommodated in a charging device or a stand in which a rechargeable appliance can be placed. The secondary yoke is accommodated in the rechargeable appliance, and the end surfaces of the secondary yoke will be positioned opposite the end surfaces of the primary yoke upon placement in the stand. Both the rechargeable appliance and the stand have a housing, and for strength and safety reasons it is not possible to use an extremely small wall thickness for the housing so as to minimize the distance between the end surfaces of the primary yoke in the stand and the end surfaces of the secondary yoke in the rechargeable appliance. The consequence is thus a relatively large air gap 18.

The relatively large air gap 18 leads to a poor magnetic coupling between the primary yoke 2 and the secondary yoke 6, because a major portion of the magnetic field lines 20 generated in the primary yoke 2 cannot be detected by the secondary yoke 6. This leads to wattless currents through the primary winding 4, resulting in large ohmic losses in the primary winding itself and in the components of the driving electronics of the primary winding. All this has an adverse effect on the efficiency and the cost price of the system. The efficiency is enhanced by increasing the dimensions of the yokes, and thus also of the end surfaces, but this will also lead to a higher cost price and a reduced freedom of design.

Figure 2:
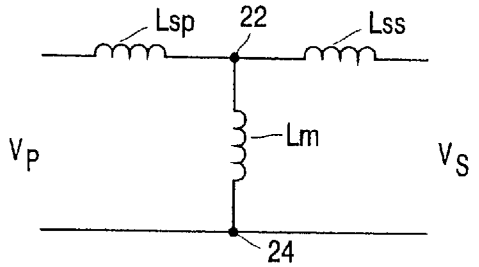
FIG. 2 is an electric equivalent circuit diagram of a conventional inductive coupling system.

FIG. 2 shows an electric equivalent circuit diagram of an inductive coupling system according to FIG. 1, with a primary leakage inductance Lsp, a secondary leakage inductance Lss, and a mutual self-inductance Lm present between the junction 22 of the leakage inductances and a common junction point 24. A satisfactory transfer requires a maximum impedance between the junction points 22 and 24 e.g. of the mutual self-inductance Lm, in comparison with the primary leakage inductance Lsp and the secondary leakage inductance Lss.

Figure 3:
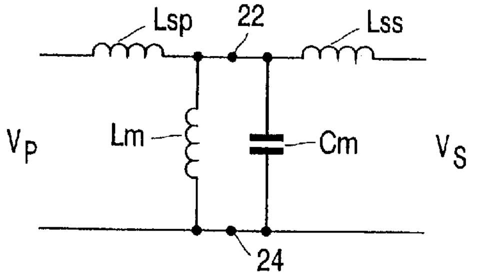
FIG. 3 is an electric equivalent circuit diagram of an inductive coupling system according to the invention.

Since this cannot be achieved with a minimum-size air gap and/or large yoke dimensions, a high impedance between the junctions 22 and 24 is achieved by means of a capacitance Cm which is connected in parallel to the mutual self-inductance Lm, as is shown in FIG. 3. A very high impedance between the junctions 22 and 24 can be obtained in that the system is driven at a frequency at which parallel resonance of the mutual self-inductance Lm and the mutual capacitance Cm takes place. In other words, capacitive parallel compensation of the mutual self-inductance takes place.

Figure 4:
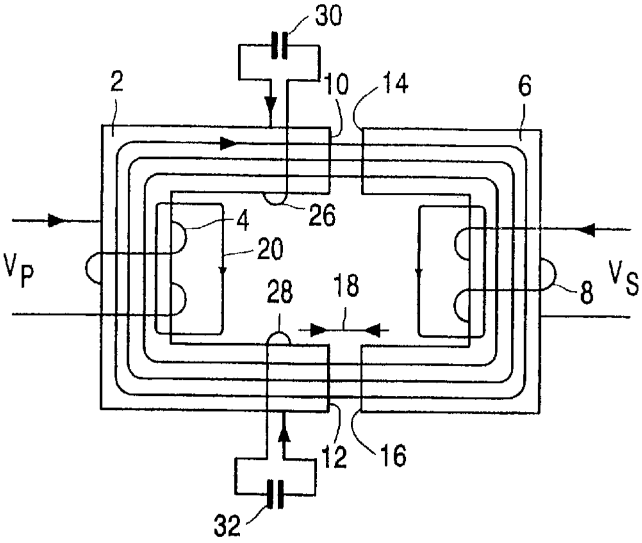
FIG. 4 is a schematic representation of a first embodiment of an inductive coupling system according to the invention.

FIG. 4 shows a first embodiment of an inductive coupling system with capacitive parallel compensation of the mutual self-inductance. To that end, two auxiliary windings 26 and 28 are provided near the end surfaces 10 and 12 of the primary yoke 2, near the air gap 18. Capacitors 30 and 32 are connected to these two auxiliary windings 26 and 28, which capacitors resonate, together with the self-inductances of the auxiliary windings, at the frequency of the primary AC voltage Vp. As a result, a negative reluctance is connected in series with the positive reluctance of the air gaps. When resonance takes place, the two reluctances will be identical, cancelling each other out. It will be understood that this effect is already obtained if only one auxiliary winding and one capacitor are arranged either on the primary yoke 2 or on the secondary yoke 6.

Figure 5:
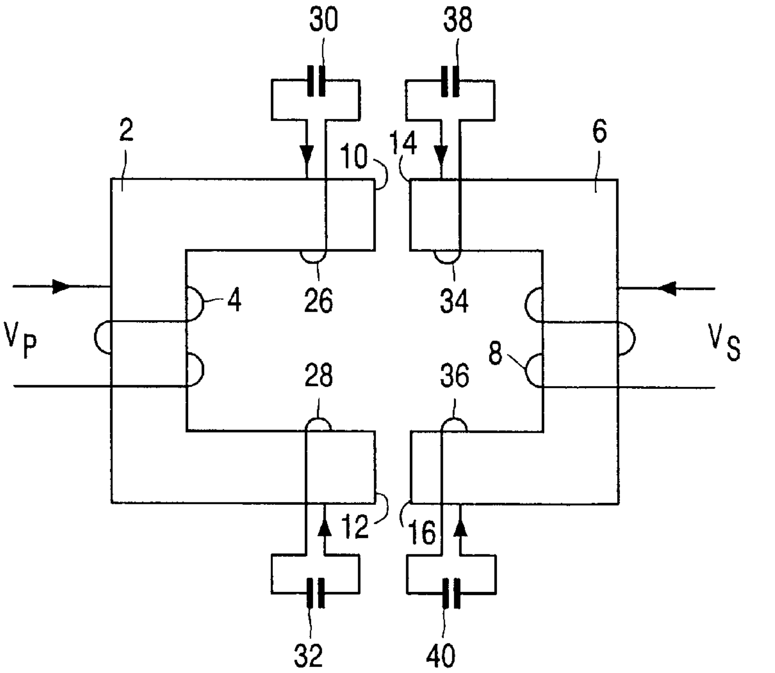
FIG. 5 is a schematic representation of a second embodiment of an inductive coupling system according to the invention.

FIG. 5 shows a second embodiment, in which also the secondary yoke 6 is provided with auxiliary windings 34 and 36 and capacitors 38 and 40 connected thereto. This leads to an even further reduction of the magnetic impedance of the air gaps.

Figure 6:
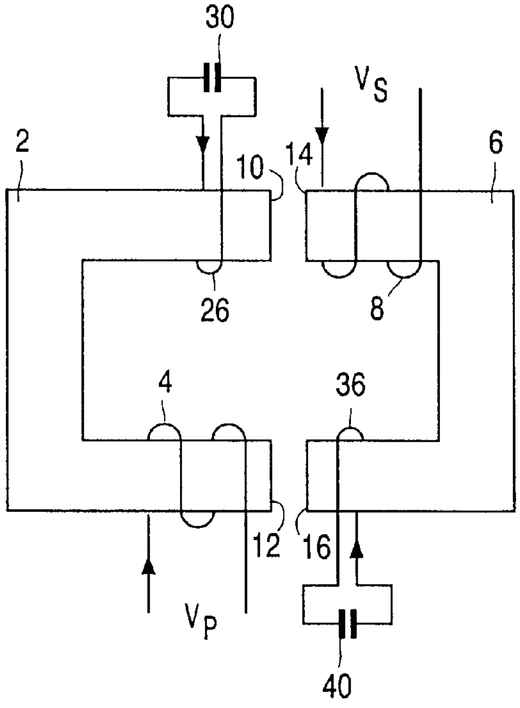
FIG. 6 is a schematic representation of a third embodiment of an inductive coupling system according to the invention.

FIG. 6 shows a modification in which the primary winding 4 and the secondary winding a are arranged on mutually opposed legs of the primary yoke 2 and the secondary yoke 6, and in which the auxiliary windings 26 and 36 and their associated capacitors 30 and 40 are arranged on the other mutually opposed legs of the yokes.

Another version of the replacement paragraph(s), marked-up to show all the changes relative to the previous version of the paragraph(s), accompanies this paper on one or more separate pages per 37 CFR § 1.121(b) (1) (iii).

It will be understood that the U-shaped yokes shown in FIGS. 4, 5 and 6 may also be C-shaped or have any other 2-legged shape suitable for this purpose. A combination of a C-shaped primary yoke and a U-shaped secondary yoke, or vice versa, is also possible. The end surfaces of the yokes may be rectangular, or round, or have any other shape. It is also possible for the end surfaces of the primary and those of the secondary yokes to be different in shape.

Figure 7:
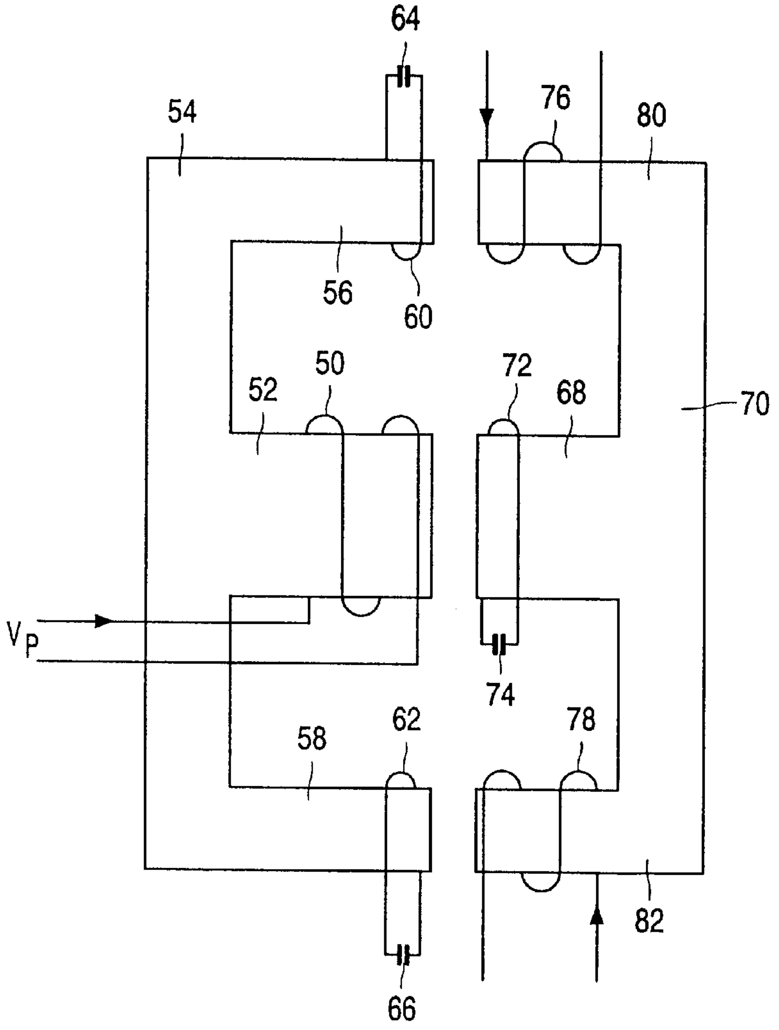
FIG. 7 is a schematic representation of a fourth embodiment of an inductive coupling system according to the invention.

FIG. 7 shows a modification comprising 3-legged, E-shaped yokes. The primary winding 50 is arranged on the central leg 52 of the primary yoke 54, whilst the ends of the two outer legs 56 and 58 carry auxiliary windings 60 and 62, respectively, to which the capacitors 64 and 66 are connected. Arranged on the end of the central leg 68 of the secondary yoke 70 is an auxiliary winding 72, to which the capacitor 74 is connected. The secondary winding is split up into two subwindings 76 and 78 which are arranged on the outer legs 80 and 82 of the secondary yoke 70.

Figure 8:
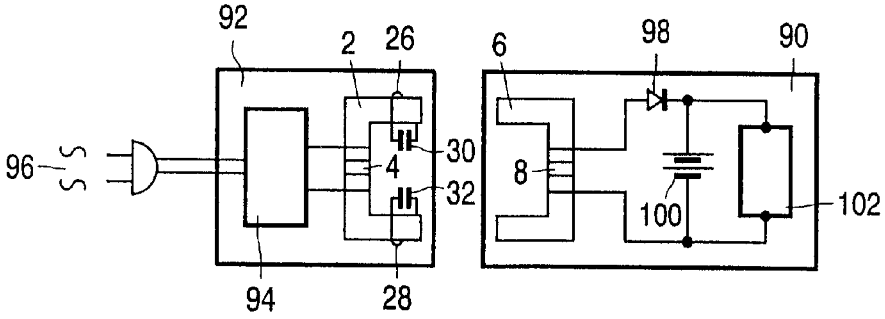
FIG. 8 is a simplified electric diagram of a combination of a rechargeable appliance and a stand provided with an inductive coupling system according to the invention.
Figure 9:
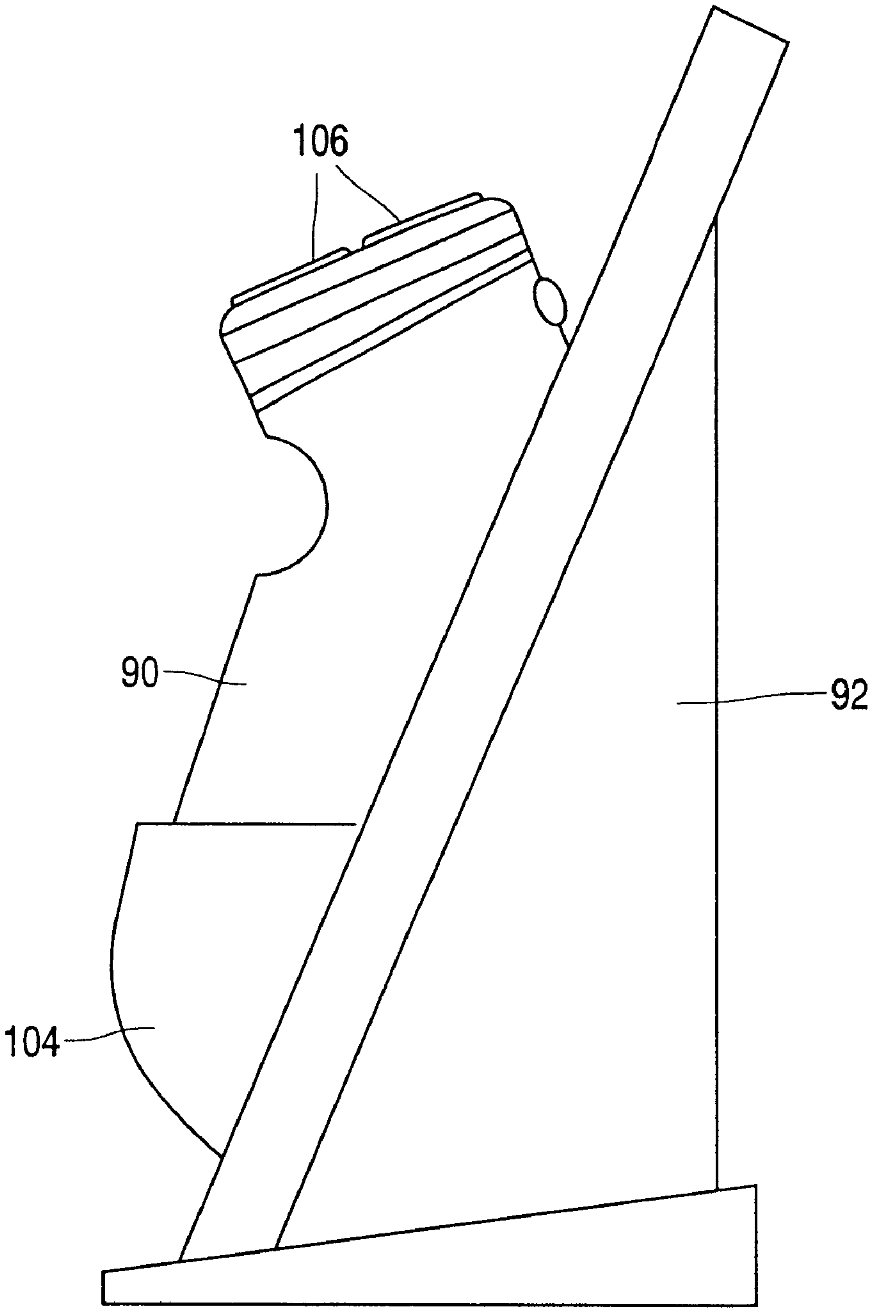
FIG. 9 is an elevation of the combination of FIG. 8.

FIG. 8 shows a simplified electric diagram of the combination of a rechargeable appliance 90 and a stand 92. The secondary yoke 6 and the secondary winding 8 are present in the rechargeable appliance 90, and the primary yoke 2 and the primary winding 4 as well as the auxiliary windings 26 and 28 and the associated capacitors 30 and 32 are present in the stand 92, all this as shown in FIG. 4. The modifications that are shown in FIGS. 5, 6 and 7 may be used for this purpose equally well, however. The stand 92 furthermore includes driving electronics 94, which are known per se, for driving the primary winding 4. Said driving electronics 94 convert the mains voltage 96 into a DC voltage, which is converted by means of an oscillator circuit into an AC voltage with which the primary winding 4 is driven. The rechargeable appliance 90 furthermore includes a rectifier 98 and a rechargeable battery 100 which are connected in series with the secondary winding 8. The rechargeable battery 100 supplies feeds a load 102 of a type which depends on the type of rechargeable appliance. The rechargeable appliance 90 may be an electric razor, for example, as shown in FIG. 9, which can be placed in a suitable space 104 of the stand 92 for recharging the battery 100. The primary yoke 2 in the stand 92 and the secondary yoke 6 in the rechargeable appliance 90 are positioned within the housings of the stand 92 and the appliance 90 such that the end surfaces of the primary yoke 2 and of the secondary yoke 6 will face each other when the appliance 90 is placed in the space 104 of the stand 90 so as to enable a magnetic coupling between the two yokes. In that case, a secondary AC voltage becomes available across the secondary winding 8, by means of which voltage the battery 100 is charged via the rectifier 98. In the case of an electric razor, the load 102 comprises, for example, a drive motor (not shown), for the shaving heads 106 and an on/off switch (not shown) for the motor. The stand 92 and the rechargeable appliance 92 together form a contactless inductive charging system which is very suitable for the aforesaid electric razor because it is watertight and because it is not affected by dust and corrosion, as is the case with charging devices fitted with contacts. The use of the capacitive parallel compensation of the mutual self-inductance by means of auxiliary windings and capacitors enables higher charging currents for the rechargeable battery 100 without there being a need to increase the dimensions of the yokes 2 and 6. It will be understood that this contactless charging system is not limited to electric razors, but that it may also be used for other rechargeable appliances such as electric toothbrushes, mobile telephones, electric drills and the like.

What is claimed is:

1. An inductive coupling system comprising:

a magnetizable core with a primary yoke provided with a primary winding for connecting a primary AC voltage; and a secondary yoke provided with a secondary winding, the primary yoke and secondary yoke having corresponding end surfaces for magnetic energy transfer between the primary yoke and the secondary yoke, the inductive coupling system including means for capacitive parallel compensation of a mutual self-inductance of the coupling system at the frequency of the primary AC voltage, the means for capacitive parallel compensation including an auxiliary winding which is arranged near at least one of said end surfaces, to which said auxiliary winding a capacitor is connected which resonates with the auxiliary winding at the frequency of the primary AC voltage.

2. The inductive coupling system of claim 1, wherein the primary yoke and the secondary yoke are 2-legged, the primary winding being arranged in the central portion of the primary yoke and the auxiliary winding and the capacitor being arranged near each of the two end surfaces of the primary yoke.

3. The inductive coupling system of claim 2, wherein the secondary winding is arranged in the central portion of the secondary yoke, and the auxiliary winding and the capacitor are additionally arranged near each of the two end surfaces of the secondary yoke.

4. The inductive coupling system of claim 1, wherein the primary yoke and the secondary yoke are 2-legged, the primary winding being arranged on one leg of the primary yoke and the auxiliary winding and the capacitor being arranged near the end surface of the other leg of the primary yoke.

5. The inductive coupling system of claim 4, wherein the secondary winding is arranged on one leg of the secondary yoke, and the auxiliary winding and the capacitor are additionally arranged near the end surface of the other leg of the secondary yoke.

6. The inductive coupling system of claim 1, wherein the primary yoke and the secondary yoke are E-shaped, having a central leg and two outer legs, while the primary winding is arranged on the central leg of the primary yoke, and the auxiliary winding and the capacitor are arranged near each of the two end surfaces of the two outer legs of the primary yoke.

7. The inductive coupling system of claim 6, wherein the secondary winding is arranged in parts on the two outer legs of the secondary yoke, and the auxiliary winding and the capacitor are additionally arranged near the end surface of the central leg of the secondary yoke.

8. A combination of a rechargeable appliance and a stand for placement of the rechargeable appliance in the stand for the purpose of recharging a rechargeable battery in the rechargeable appliance, wherein:

the combination is provided with the inductive coupling system of claim 2;

the primary yoke and the primary winding are accommodated in the stand; and the secondary yoke and the secondary winding are accommodated in the rechargeable appliance.

* * * * *